US012082328B2

United States Patent
Lee et al.

(10) Patent No.: US 12,082,328 B2
(45) Date of Patent: *Sep. 3, 2024

(54) COOKING DEVICE

(71) Applicant: SHINSTARR PRESENTS CORP., Seoul (KR)

(72) Inventors: Sangrok Lee, Seoul (KR); Koangkyun La, Seoul (KR)

(73) Assignee: SHINSTARR PRESENTS CORP., Seoul (KR)

( * ) Notice: Subject to any disclaimer, the term of this patent is extended or adjusted under 35 U.S.C. 154(b) by 655 days.

This patent is subject to a terminal disclaimer.

(21) Appl. No.: 17/424,456

(22) PCT Filed: May 13, 2021

(86) PCT No.: PCT/KR2021/005997
§ 371 (c)(1),
(2) Date: Jul. 20, 2021

(87) PCT Pub. No.: WO2021/261768
PCT Pub. Date: Dec. 30, 2021

(65) Prior Publication Data
US 2022/0304510 A1    Sep. 29, 2022

(30) Foreign Application Priority Data
Jun. 22, 2020  (KR) .................. 10-2020-0075953

(51) Int. Cl.
*H05B 6/12*    (2006.01)
*A47J 27/00*   (2006.01)
(Continued)

(52) U.S. Cl.
CPC .............. *H05B 6/12* (2013.01); *A47J 27/002* (2013.01); *A47J 36/32* (2013.01); *A47J 37/047* (2013.01); *A47J 43/0722* (2013.01)

(58) Field of Classification Search
CPC ................................................... A47J 37/047
See application file for complete search history.

(56) References Cited

U.S. PATENT DOCUMENTS 4,173,925 A  *  11/1979  Leon .................... B01F 35/92
                                                    99/348
2006/0112838 A1    6/2006  Herbst ........................ 99/422
(Continued)

FOREIGN PATENT DOCUMENTS

JP           2548653 Y2  *  9/1997
JP        2004-243014 A      9/2004
(Continued)

OTHER PUBLICATIONS

JP 2548653 Y2 (Sato, Kiyoshi) Sep. 24, 1997 [retrieved on May 18, 2024]. Retrieved from Foreign Image and Text database, translation by Clarivate Analytics. (Year: 1997).*
(Continued)

*Primary Examiner* — John J Norton
(74) *Attorney, Agent, or Firm* — Stein IP LLC

(57) ABSTRACT

Proposed is a cooking apparatus. The cooking apparatus may include: an inner portion in which a food is contained and heated; an outer portion installed in a shape that surrounds an outside of the inner portion; a heating portion configured to heat the inner portion by using electrical energy; a housing portion installed in a shape that surrounds both the heating portion and the outer portion; a first driving portion positioned between the outer portion and the housing portion, and configured to rotate the inner portion in a first direction; and a second driving portion positioned outside the housing portion and configured to rotate the housing portion in a second direction.

17 Claims, 14 Drawing Sheets

(51) Int. Cl.
*A47J 36/32* (2006.01)
*A47J 37/04* (2006.01)
*A47J 43/07* (2006.01)

(56) References Cited

U.S. PATENT DOCUMENTS

2015/0327724 A1* 11/2015 Jo .................. A47J 27/004
                                                99/348
2017/0354287 A1* 12/2017 Chang ................ H05B 6/12
2020/0375398 A1* 12/2020 Pan ................ B08B 9/0821

FOREIGN PATENT DOCUMENTS

| | | | |
|---|---|---|---|
| JP | 2006-61183 A | 3/2006 | |
| KR | 10-1003235 B1 | 12/2010 | |
| KR | 101461402 B1 * | 11/2014 | ............. A47J 37/06 |
| KR | 10-1674670 B1 | 11/2016 | |
| KR | 10-2231776 B1 | 3/2021 | |

OTHER PUBLICATIONS

KR 101461402 B1 (Jeong, Gug-jin) Nov. 13, 2014 [retrieved on May 18, 2024]. Retrieved from Foreign Image and Text database, translation by Clarivate Analytics. (Year: 2014).*
International Search Report mailed Jul. 30, 2021, issued to the corresponding International Application No. PCT/KR2021/005997.
PCT Written Opinion of ISA mailed Jul. 30, 2021, issued to the corresponding International Application No. PCT/KR2021/005997.

* cited by examiner (a)

(b)

(c)

(d)

COOKING DEVICE

CROSS-REFERENCE TO RELATED APPLICATIONS

This application is a national stage of International Application No. PCT/KR2021/005997, filed May 13, 2021, which claims the benefit of Korean Application No. 10-2020-0075953, filed Jun. 22, 2020, in the Korean Intellectual Property Office, the disclosures of which are incorporated herein by reference.

TECHNICAL FIELD

The present disclosure relates to a cooking apparatus. More particularly, the present disclosure relates to a cooking apparatus that is configured to heat and stir-fry a food.

BACKGROUND ART

In general, stir-fried food, such as a stir-fried spicy pork, a stir-fried *Octopus ocellatus*, a bowl of stir-fried rice, etc., is prepared in a stir-frying manner where various ingredients are mixed together and are placed in a cooking container such as a frying pan, a pot, or the like, and then appropriately stir-fried while heating and stirring for a predetermined time.

In particular, in order to prepare stir-fried cooking using meat, such as beef, pork, poultry, etc., and various by-products, and also various seafoods such as *Octopus ocellatus, Octopus minor*, squid, etc., to be tasty, uniform heat should be evenly applied to food ingredients. For achieving this, a chef should continuously perform mixing of the ingredients for stir-fried food in front of a cooking table.

For example, when a chef grabs a handle of a pan and pulls with a small radius snap, then pushes and raises the pan, food ingredients accommodated at a bottom surface of the pan will rise quickly around an inner circumference of the pan and then flip over again to the bottom surface of the pan. In a similar manner, when the chef grabs the handle of the pan and pushes with a small radius snap, then pulls and raises the pan, the food ingredients accommodated at the bottom surface of the pan will rise quickly around the inner circumference of the pan and then flip over again to the bottom surface of the pan. By performing these repetitive movements, stir-fried cooking performed.

However, in order for the chef to flip the food ingredients by using the pan, a snap of a wrist has to be used, and there is a problem in that strain on a wrist joint or an arm joint occurs due repeating of the repetitive snap movement.

In addition, since one chef may only prepare one food at once, it is difficult to prepare a large amount of foods or different types of stir-fried foods at the same time. Therefore, there is a need for solving the problems.

The related art of the present disclosure is disclosed in Korean Patent Application Publication No. 10-2019-0130084 (published on Nov. 21, 2019 and entitled: Apparatus for roast cook).

DISCLOSURE

Technical Problem

An objective of the present disclosure is to provide a cooking apparatus capable of automatically cooking a stir-fried food.

In addition, another objective of the present disclosure is to provide a cooking apparatus capable of mixing and stir-frying a food in various manners.

The objectives of the present disclosure are not limited to the objectives mentioned above, and other objectives and advantages of the present disclosure can be understood from the descriptions below and can be more clearly understood from the embodiments of the present disclosure. In addition, it should be easily appreciated that the objectives and advantages of the present disclosure may be achieved from the elements disclosed in the claims and combinations thereof.

Technical Solution

A cooking apparatus according to the present disclosure may include: an inner portion in which a food is contained and heated; an outer portion installed in a shape that surrounds an outside of the inner portion; a heating portion configured to heat the inner portion by using electrical energy; a housing portion installed in a shape that surrounds both the heating portion and the outer portion; a first driving portion positioned between the outer portion and the housing portion, and configured to rotate the inner portion in a first direction; and a second driving portion positioned outside the housing portion and configured to rotate the housing portion in a second direction.

In addition, the first direction may be a direction in which the inner portion is rotated around a first imaginary line that extends in a longitudinal direction of the inner portion, and the second direction may be a direction in which the housing portion is rotated around a second imaginary line that extends to a side surface of the housing portion.

In addition, the present disclosure may further include a first stirring portion fixed to an inside of the inner portion and configured to stir the food by being rotated together with the inner portion.

In addition, the first stirring portion may protrude to the inside of the inner portion and may extend in a longitudinal direction of the inner portion.

In addition, the present disclosure may further include a second stirring portion installed in a direction intersecting the first stirring portion, the second stirring portion being positioned at a base member of the inner portion, and being configured to stir the food together with the first stirring portion.

In addition, the second stirring portion may include: a core member positioned at an upper portion of the base member, and provided with magnetic poles at both sides thereof; and a fixed member fixed to an inside of the housing portion facing the core member, and provided with magnetic poles that are opposite to the magnetic poles of the core member.

In addition, when the inner portion is rotated, a rotation of the core member may be restrained by the fixed member.

In addition, the heating portion may include an induction wire installed in a shape that surrounds an outside of the outer portion.

In addition, the first driving portion may include a first motor member fixed to the housing portion facing the outer portion and configured to convert electrical energy to rotational power.

In addition, a first output shaft of the first motor member may be connected to a rotation center of the inner portion and may be configured to rotate the inner portion in the first direction.

In addition, the second driving portion may include: a second motor member installed in a position spaced apart from the housing portion, and configured to convert electrical energy to rotational power; and a power transmitting portion connecting a second output shaft to the housing portion.

In addition, the housing portion that receives the rotational power of the second motor member may be rotated in the second direction.

In addition, the second driving portion may further include: a target measurement member fixed to the power transmitting portion, and configured to be rotated together with the power transmitting portion; and a sensor member installed at a position facing a movement path of the target measurement member, and configured to detect a movement of the target measurement member in a non-contact manner.

In addition, the second driving portion may further include: an inner support portion configured to support the second motor member; and an elevating portion configured to ascend and descend the inner support portion.

In addition, the elevating portion may include: an elevating body positioned at a lower side of the inner support portion and configured to generate power; and a rod member that protrudes to an upper side of the elevating body and is connected to the inner support portion, and configured to be moved in a vertical direction by a movement of the elevating body.

In addition, the present disclosure may further include: a body portion configured to support the second driving portion; a water collecting portion formed with a groove portion that has a shape concaved downwardly from an upper portion of the body portion facing the housing portion; and an injecting portion installed at the body portion and configured to inject water toward the inner portion or the housing portion.

In addition, the present disclosure may further include: a direct-firing pipeline configured to supply both fuel gas and air toward the inner portion; and a valve portion connected to the direct-firing pipeline and configured to control both the fuel gas and the air.

Advantageous Effects

According to the cooking apparatus of the present disclosure, a rotation and an inclination angle of the inner portion of the apparatus are capable of being adjusted by using the first driving portion and the second driving portion, and time and cost for preparing a food may be reduced since the food is automatically heated by the heating portion and the direct-firing portion.

In addition, the food is easily mixed by the first stirring portion and the second stirring portion, and various tastes of the food may be prepared since the food is mixed and stir-fried in various manners.

In addition, since cleaning of the inner portion is automatically performed by the injecting portion, time and cost required to clean the inner portion may be reduced.

In addition to the effects as described above, specific effects in accordance with the present disclosure will be described together with the detailed description for carrying out the present disclosure.

DESCRIPTION OF REFERENCE NUMERALS

Figure 1:
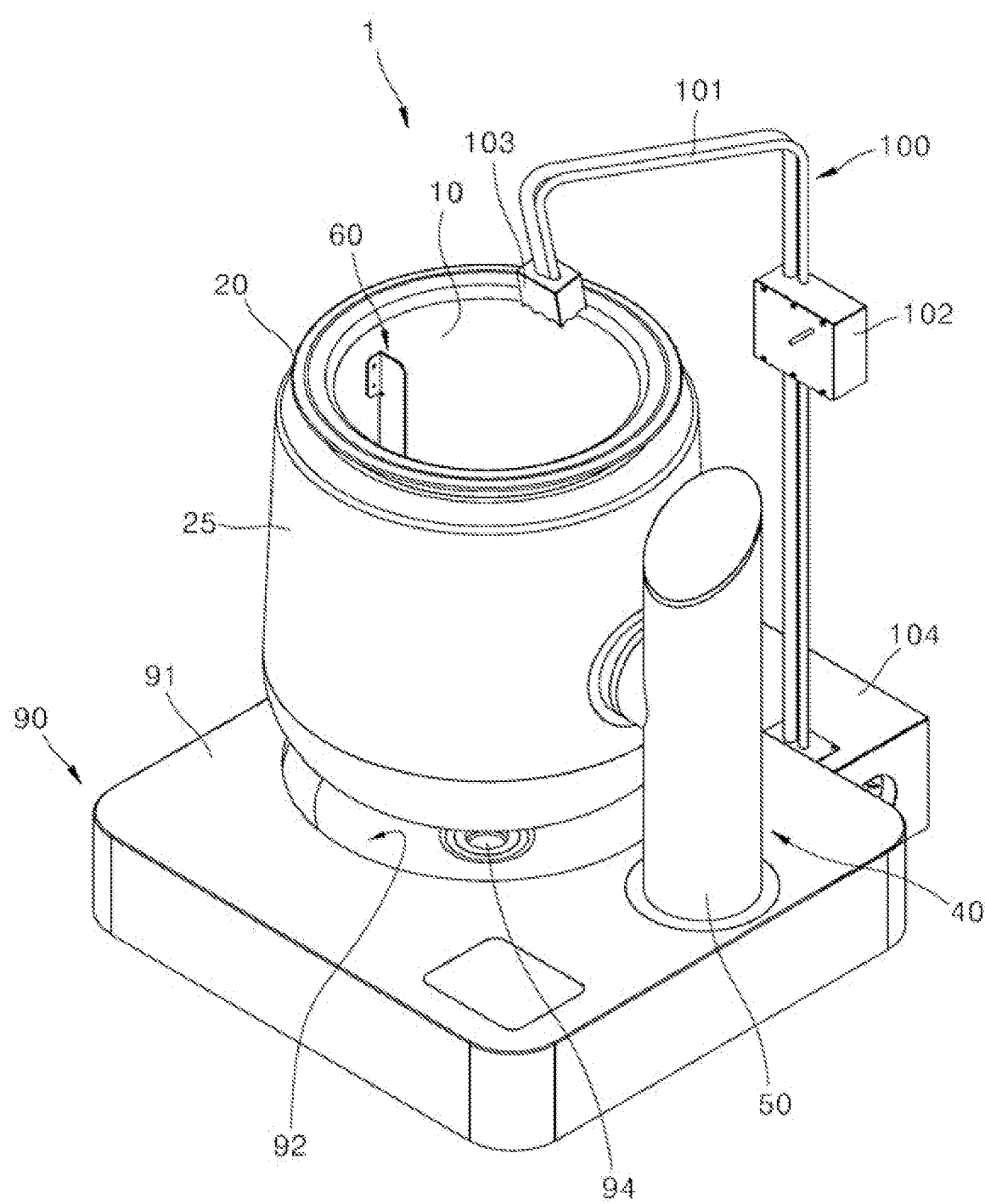
FIG. 1 is a perspective view schematically illustrating a configuration of a cooking apparatus according to an embodiment of the present disclosure.

1: Cooking apparatus
10,200: Inner portion 11: Base member
20: Outer portion
25: Housing portion 26: Housing body 27: Housing cover
28: Fixed support portion
30: First driving portion 31: First motor member 32: First output shaft
40: Second driving portion 41: Second motor member 42: Second output shaft 43: Power transmitting portion 44: Target measurement member 45: Sensor member 46: Inner support portion 47: Elevating portion 48: Elevating body 49: Rod member 50: Driving case
60: First stirring portion 61: Fixing bracket 62: Rectilinear portion 63: Curved portion
70: Second stirring portion 71: Core member 72: Fixing member
80: Heating portion 81: Induction wire
90: Receiving portion 91: Body portion 92: Water collecting portion 93: Injecting portion 94: Water draining portion
100: Direct-firing portion 101: Direct-firing pipeline 102: Valve portion 103: Nozzle portion 104: Direct-firing base portion
300: Food
400: Protruding portion D: Longitudinal direction (vertical direction)
A1: First direction L1: First imaginary line
A2: Second direction L2: Second imaginary line

MODE FOR INVENTION

The above-mentioned objectives, features, and advantages will be described in detail with reference to the accompanying drawings, and accordingly, those of ordinary skill in the art to which the present disclosure pertains should be able to easily practice the technical idea of the present disclosure. In describing the present disclosure, when detailed description of known art related to the present disclosure is deemed as having a possibility of unnecessarily obscuring the gist of the present disclosure, the detailed description will be omitted. Hereinafter, exemplary embodiments according to the present disclosure will be described in detail with reference to the accompanying drawings. Like reference numerals in the drawings refer to like or similar elements throughout.

Terms such as first and second are used to describe various elements, but the elements are of course not limited by the terms. The terms are merely used for distinguishing one element from another element, and a first element may also be a second element unless particularly described otherwise.

Hereinafter, when it is said that an arbitrary element is disposed at "an upper portion (or a lower portion)" of an element or disposed "above (or below)" an element, this may not only mean that the arbitrary element is disposed in contact with an upper surface (or a lower surface) of the element, but also mean that another element may be interposed between the element and the arbitrary element disposed above (or below) the element.

Also, when it is said that a certain element is "connected" or "coupled" to another element, this may mean that the elements are directly connected or coupled to each other, but it should be understood that another element may be "interposed" between the elements or the elements may be "connected" or "coupled" to each other via another element.

Through the specification, each element may be singular or plural unless particularly described otherwise.

A singular expression used herein encompasses a plural expression unless the context clearly indicates otherwise. In the present application, terms such as "consisting of" or "including" should not be interpreted as necessarily including all of various elements or various steps described herein and should be interpreted as indicating that some of the elements or some of the steps may not be included or additional elements or steps may be further included.

Throughout the specification, "A and/or B" may refer to A, B, or A and B unless particularly described otherwise, and "C to D" refers to C or more and D or less unless particularly described otherwise.

Hereinafter, a cooking apparatus according to an embodiment of the present disclosure will be explained.

Figure 2:
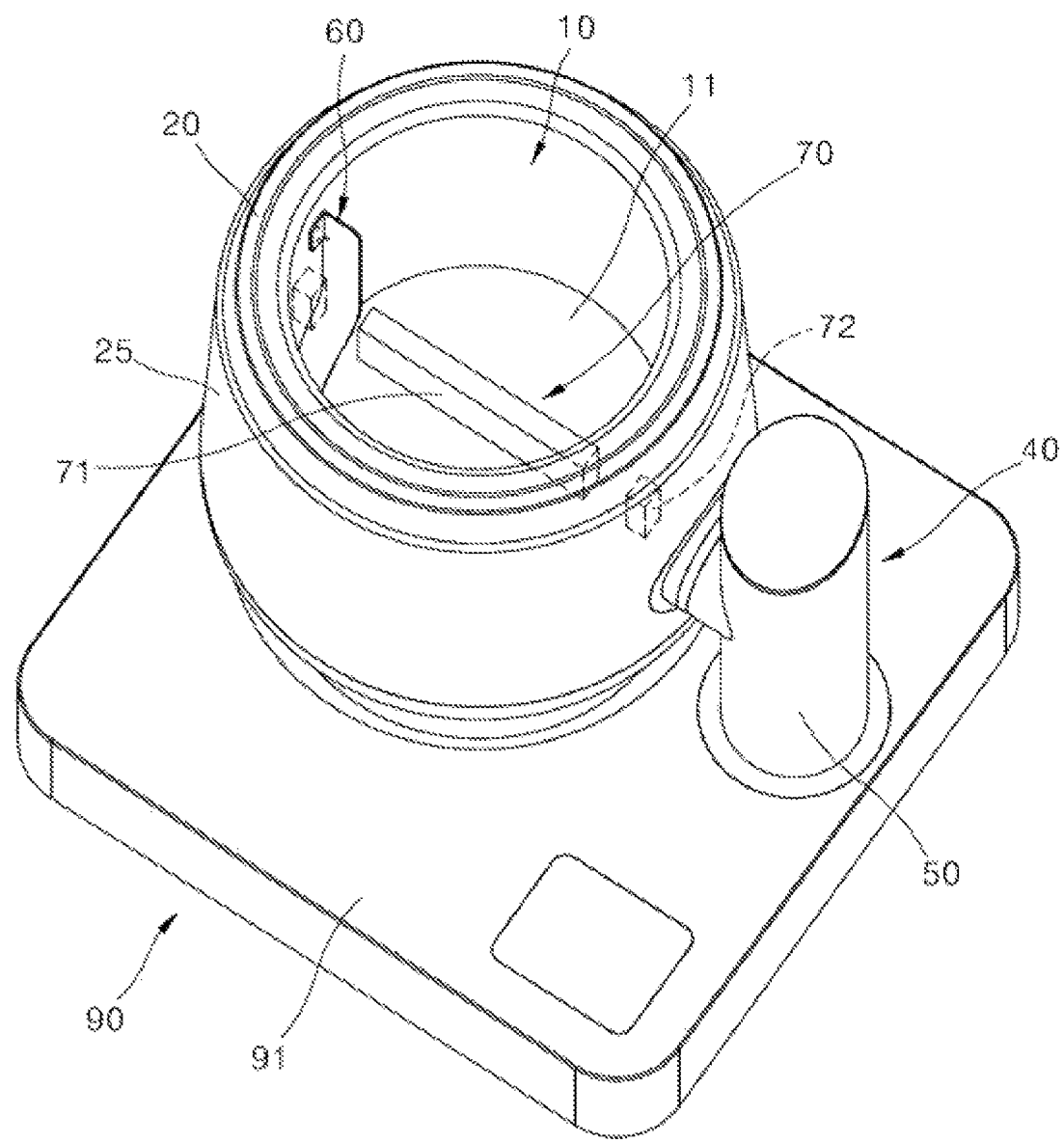
FIG. 2 is a perspective view illustrating a state in which a first stirring portion and a second stirring portion according to an embodiment of the present disclosure are installed.
Figure 3:
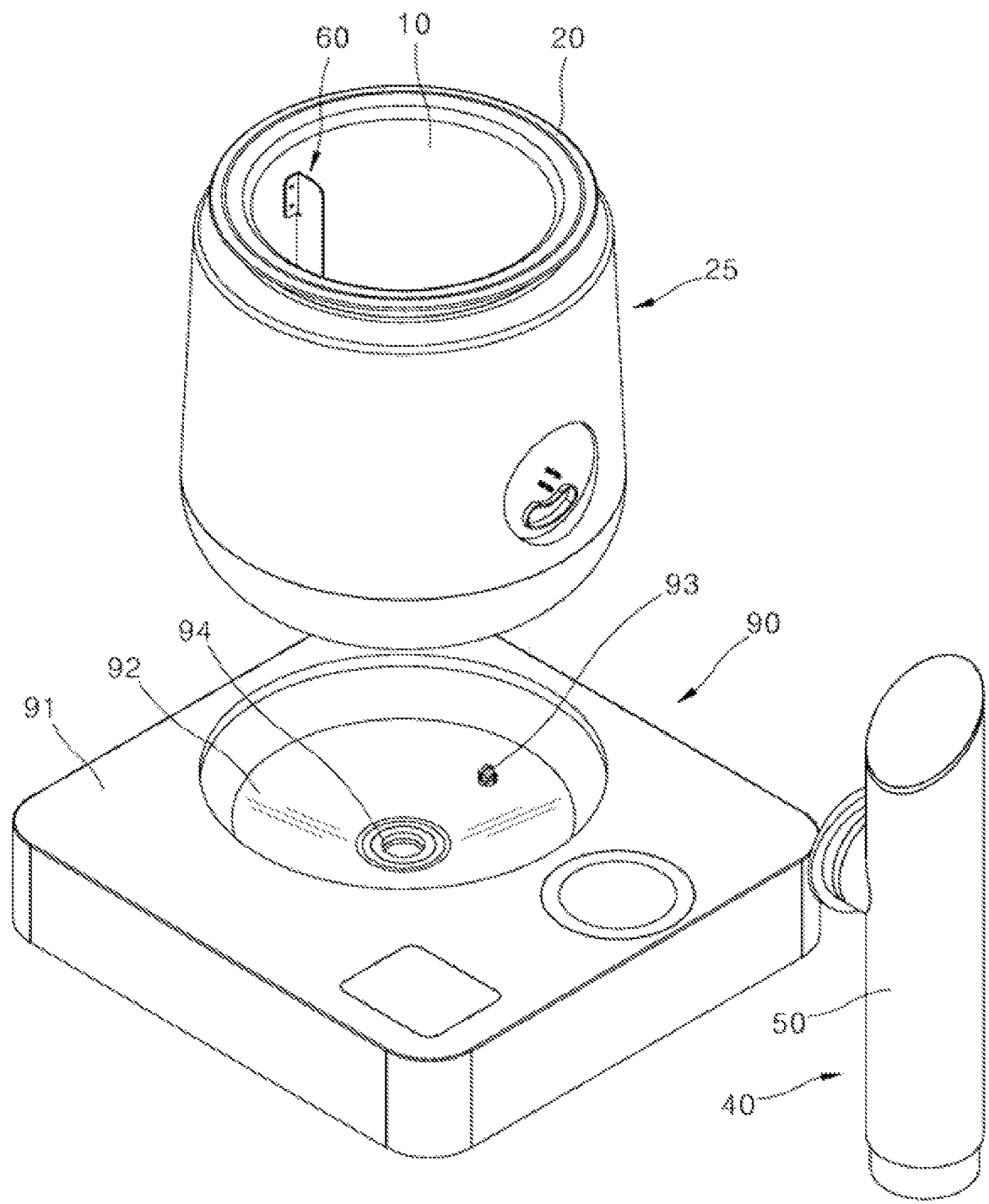
FIG. 3 is an exploded perspective view illustrating the cooking apparatus according to an embodiment of the present disclosure.

FIG. 1 is a perspective view schematically illustrating a configuration of a cooking apparatus 1 according to an embodiment of the present disclosure. FIG. 2 is a perspective view illustrating a state in which a first stirring portion 60 and a second stirring portion 70 according to an embodiment of the present disclosure are installed. FIG. 3 is an exploded perspective view illustrating the cooking apparatus 1 according to an embodiment of the present disclosure.

As illustrated in FIGS. 1 to 3, the cooking apparatus 1 according to an embodiment of the present disclosure includes an inner portion 10, an outer portion 20, a housing portion 25, a first driving portion 30, a second driving portion 40, a first stirring portion 60, a second stirring portion 70, a heating portion 80, a receiving portion 90, and a direct-firing portion 100.

Figure 4:
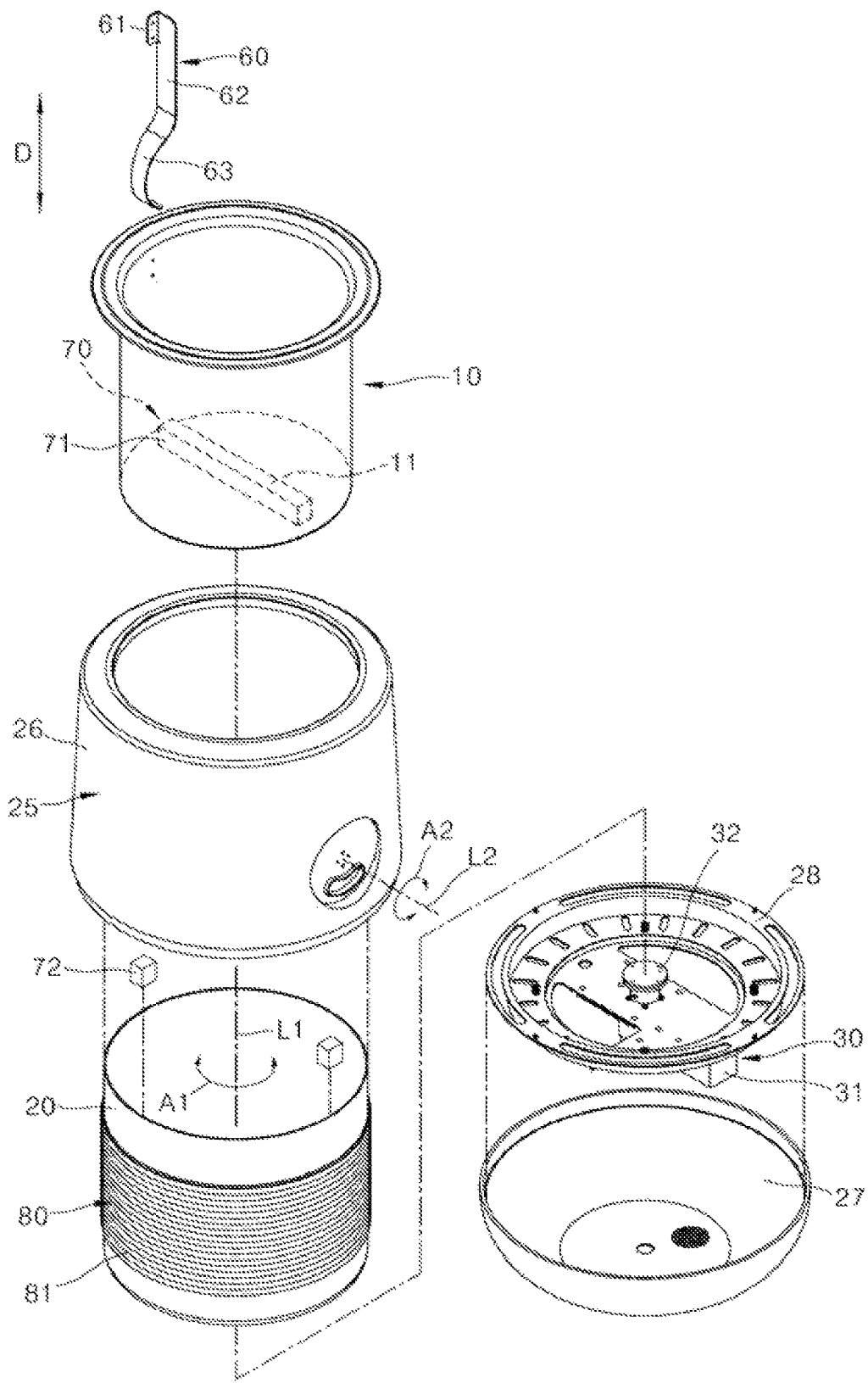
FIG. 4 is a perspective view separately illustrating an inner portion, an outer portion, and a housing portion according to an embodiment of the present disclosure.

FIG. 4 is a perspective view separately illustrating the inner portion 10, the outer portion 20, and the housing portion 25 according to an embodiment of the present disclosure.

As illustrated in FIGS. 1 to 4, a food 300 is accommodated inside the inner portion 10, and the inner portion 10 may be variously modified within the technical idea of heating by an external heat source. The inner portion 10 according to an embodiment of the present disclosure has an upper side opened, and the food 300 is accommodated inside the inner portion 10. In addition, a base member 11 formed in a circular plate shape is positioned at a bottom surface of the inner portion 10.

The outer portion 20 is installed in a shape that surrounds an outside of the inner portion 10. In addition, the outer portion 20 is positioned at a lower side of the inner portion 10, and an inner diameter of the outer portion 20 is larger than an outer diameter of the inner portion 10. The outer portion 20 also has a shape wherein an upper side of the outer portion 20 is opened. A stir-frying container according to the present disclosure has a dual structure. A reinforced plastic is used as a material of the outer portion 20, and SUS430 ferromagnetic material may be included in a material of the inner portion 10. Therefore, the inner portion 10 is heated by an induction coil that is installed along a circumference of the outer portion 20.

The housing portion 25 may be variously modified within the technical idea in which the housing portion 25 is installed in a shape that surrounds both the heating portion 80 and the outer portion 20. The housing portion 25 according to an embodiment of the present disclosure includes a housing body 26, a housing cover 27, and a fixed support portion 28. The housing body 26 has a shape that surrounds the outer portion 20, and has a shape that an upper side and a lower side of the housing body 26 are opened.

The housing cover 27 is installed in a shape that covers a lower side of the housing body 26. The housing cover 27 is installed in a shape that is concaved downwardly, and is fixed to the lower side of the housing body 26.

The fixed support portion 28 is positioned between the housing portion 25 and the housing cover 27, and the first driving portion 30 is mounted at the fixed support portion 28. The fixed support portion 28, which is positioned at an upper side of the housing cover 27, is fixed to the lower side of the housing body 26.

The first driving portion 30 is positioned between the outer portion 20 and the housing portion 25, and the first driving portion 30 may be variously modified within the technical idea of rotating the inner portion 10 in a first direction A1. The first driving portion 30 according to an embodiment of the present disclosure may include: a first motor member 31 fixed to the housing portion 25 facing the outer portion 20, and configured to convert electrical energy to rotational power; and a first output shaft 32 protruding from the first motor member 31 and fixed to the base member 11 of the inner portion 10.

The first output shaft 32 of the first motor member 31 is connected to a rotation center of the inner portion 10 and is configured to rotate the inner portion 10 in the first direction A1. The first motor member 31 is fixed to a lower side of the fixed support portion 28, and the first output shaft 32 extends to an upper side of the fixed support portion 28 and is fixed to a lower side of the base member 11. Therefore, the inner portion 10 is rotated by a rotation of the first output shaft 32. A connection between the inner portion 10 and the first output shaft 32 may be performed in a fitting manner. As necessary, the connection between the inner portion 10 and the first output shaft 32 may be performed in variously modified manners such as bolting, welding, and so on.

Figure 6:
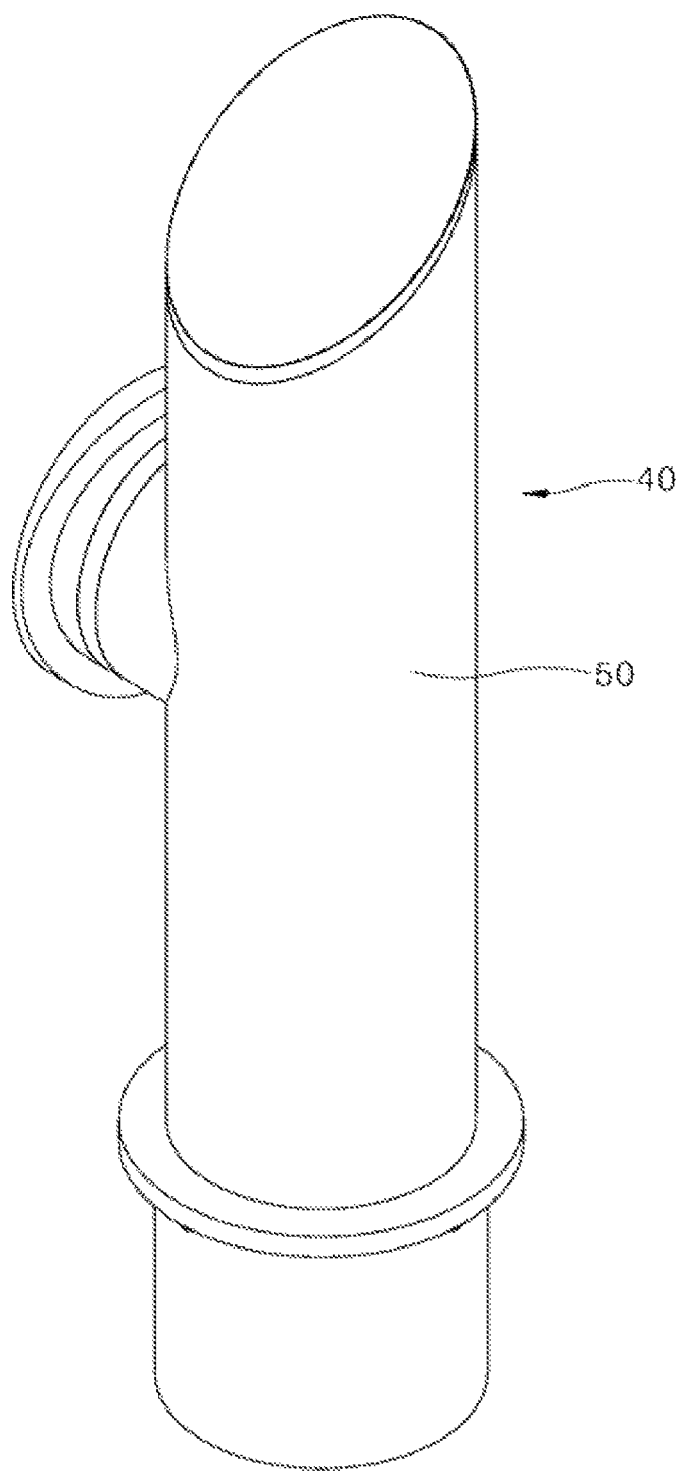
FIG. 6 is a perspective view illustrating an outside of a second driving portion according to an embodiment of the present disclosure.
Figure 7:
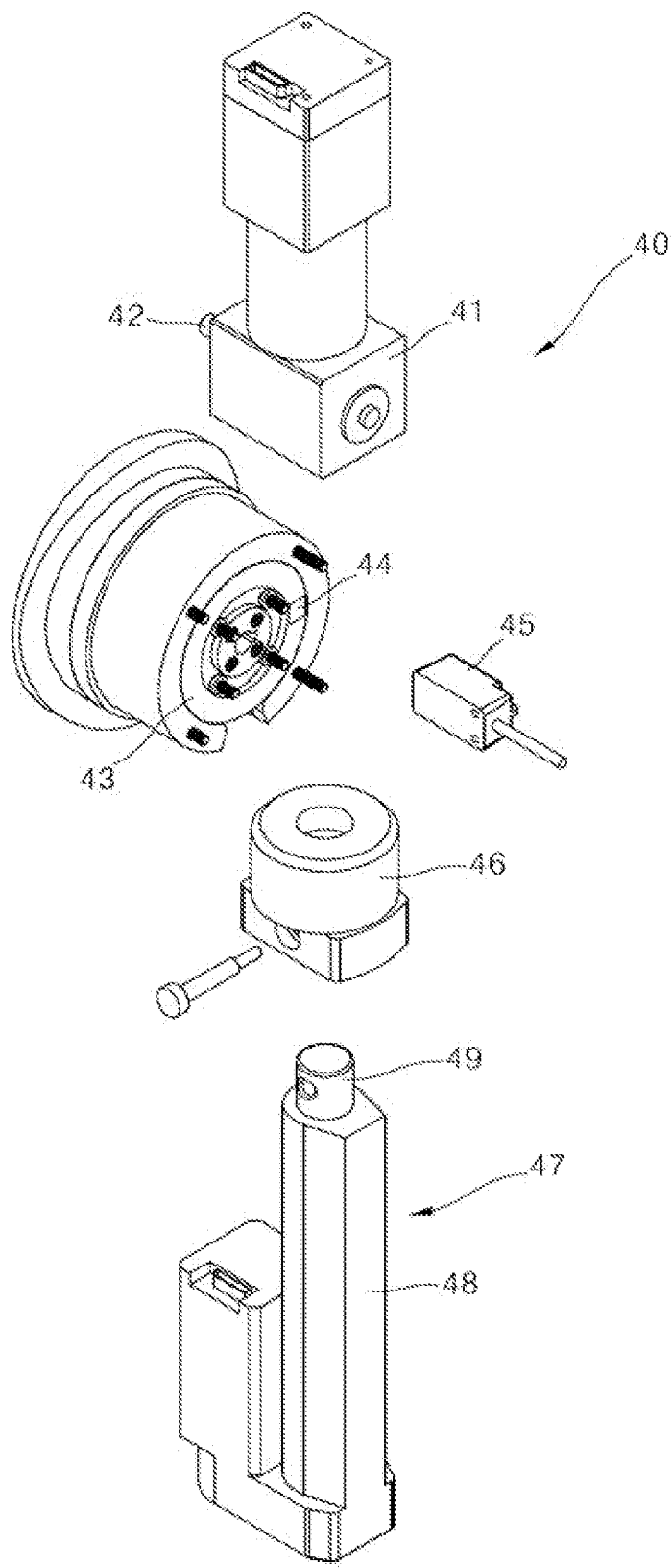
FIG. 7 is an exploded perspective view illustrating the second driving portion according to an embodiment of the present disclosure.
Figure 8:
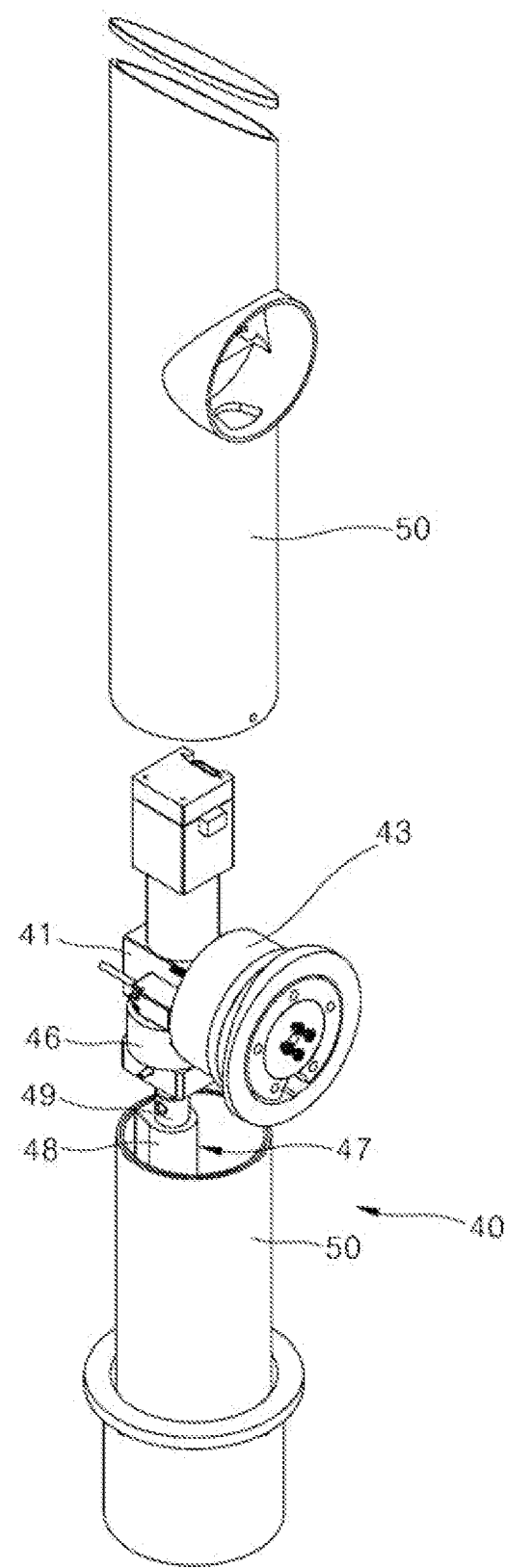
FIG. 8 is a perspective view illustrating a state in which a driving case according to an embodiment of the present disclosure is vertically separated.

FIG. 6 is a perspective view illustrating an outside of the second driving portion 40 according to an embodiment of the present disclosure. FIG. 7 is an exploded perspective view illustrating the second driving portion 40 according to an embodiment of the present disclosure. FIG. 8 is a perspective view illustrating a state in which a driving case 50 according to an embodiment of the present disclosure is vertically separated.

As illustrated in FIGS. 6 to 8, the second driving portion 40 is positioned at an outside of the housing portion 25, and the second driving portion 40 may be variously modified within the technical idea of rotating the housing portion 25 in a second direction A2. The second driving portion 40 according to an embodiment of the present disclosure may include a second motor member 41, a second output shaft 42, a power transmitting portion 43, a target measurement member 44, a sensor member 45, an inner support portion 46, an elevating portion 47, and the driving case 50.

By the second motor member 41 that uses a stepping motor, an inclination of the inner portion 10 is capable of being controlled. When a system of the cooking apparatus 1 is operated, the second driving portion 40 is operated so that the inner portion 10 is positioned to be in a vertical direction. Since the second motor member 41, which is the stepping motor, is operated and adjust the inclination of the housing portion 25, the inner portion 10 and the outer portion 20 that are positioned inside the housing portion 25 are rotated together with the housing portion 25.

The second motor member 41 is installed at a position spaced apart from the housing portion 25, and various types of motors may be used within the technical idea of converting electrical energy to rotational power. The stepping motor is used as the second motor member 41 according to an embodiment of the present disclosure. Moreover, a servo motor may be used as the second motor member 41.

The power transmitting portion 43 may be variously modified within the technical idea of connecting the second output shaft 42 of the second motor member 41 to the housing portion 25. The power transmitting portion 43 according to an embodiment of the present disclosure extends in a horizontal direction, and has a first side fixed to the outside of the housing portion 25 and has a second side connected to the second output shaft 42 of the second motor member 41. Therefore, the housing portion 25, which receives power of the second motor member 41, may be rotated in the second direction A2.

The target measurement member 44 is fixed to the power transmitting portion 43, and is a metal piece that is rotated together with the power transmitting portion 43. In addition, the sensor member 45 is installed at a position facing a movement path of the target measurement member 44, and is configured to detect a movement of the target measurement member 44 in a non-contact manner.

The inner portion 10, which corresponds to the stir-fry container, rotates together with the housing portion 25, and the housing portion 25 rotates together with the power transmitting portion 43. In addition, the target measurement member 44 installed at the power transmitting portion 43 also rotates together with the power transmitting portion 43 so that the inner portion 10 and the target measurement member 44 rotate together. The inner portion 10 is installed in the vertical direction that is an initialization position, and the target measurement member 44 is positioned facing the sensor member 45 when an entrance of the inner portion 10 is installed in an upward direction. Therefore, the sensor member 45 detects the movement of the target measurement member 44 and allows the inner portion 10 to be in a stopped state.

The inner support portion 46 supports the second motor member 41, and may be moved in the vertical direction together with the second motor member 41. The inner support portion 46 is positioned at a lower portion of the second motor member 41, and the second motor member 41 is fixed in an attachable/detachable manner to an upper side of the inner support portion 46.

The elevating portion 47 may be variously modified within the technical idea of ascending and descending the inner support portion 46. The elevating portion 47 according to an embodiment of the present disclosure may include: an elevating body 48 positioned at a lower side of the inner support portion 46 and configured to generate power; and a rod member 49 protruding to an upper side of the elevating body 48 and connected to the inner support portion 46, and configured to be moved in the vertical direction by a movement of the elevating body 48.

By being supplied with hydraulic pressure or pneumatic pressure, the elevating body 48 may supply the power to move in the vertical direction. Alternatively, a motor is installed inside the elevating body 48, and is capable of moving the rod member 49 in the vertical direction by a plurality of gears that transmits power of the motor.

The rod member 49 has a bar shape that extends in the vertical direction, and the upper side of the rod member 49 is connected to the inner support portion 46.

As illustrated in FIG. 4, the first direction A1 in the present disclosure is a direction in which the inner portion 10 is rotated around a first imaginary line L1 that extends in a longitudinal direction D of the inner portion 10, and a second direction A2 is a direction in which the housing portion 25 is rotated around a second imaginary line L2 that extends to a side surface of the housing portion 25. The inner portion 10 is rotated along the first direction A1, and rotates the food 300 existing inside the inner portion 10. In addition, an inclination angle of the inner portion 10 is adjusted along the second direction A2 so that the food 300 may be stir-fried in various manners. In addition, when the inner portion 10, which is rotated in the second direction A2, is in a state of being upside down, cleaning of the inner portion 10 may be performed or the food 300 may be contained in another container.

The first stirring portion 60 is fixed to the inside of the inner portion 10 and is rotated together with the inner portion 10, and the first stirring portion 60 may be variously modified within the technical idea of stirring the food 300. The first stirring portion 60 protrudes to the inside of the inner portion 10, and may extends in the longitudinal direction D of the inner portion 10.

The first stirring portion 60 according to an embodiment of the present disclosure includes: a fixing bracket 61 fixed to an inside surface of the inner portion 10; a rectilinear portion 62 that extends from the fixing bracket 61 and extends toward the inside of the inner portion 10; and a curved portion 63 that extends from the rectilinear portion 62 and forms a curved surface. Since the curved portion 63 being in contact with the food 300 is concavely formed, the food 300 contained in the inner portion 10 may be easily stirred.

The second stirring portion 70 is installed in a direction intersecting with the first stirring portion 60, and is positioned at the base member 11 of the inner portion 10. In addition, the second stirring portion 70 stirs the food 300 together with the first stirring portion 60. The second stirring portion 70 may be variously modified within the technical idea of being in a state in which the second stirring portion 70 maintains a fixed state and does not being rotated with the outer portion 20. The second stirring portion 70 according to an embodiment of the present disclosure may include: a core member 71 positioned at an upper side of the base member 11 and provided with magnetic poles at both sides thereof; and a fixing member 72 fixed to the inside of the housing portion 25 facing the core member 71 and provided with opposite magnetic poles. In addition, when the inner portion 10 is rotated, a rotation of the core member 71 may be restrained by the fixing member 72.

In addition, when the core member 71, which uses a magnet, is in a state of being in contact with the base member 11 of the inner portion 10, the core member 71 maintains a state in which the rotation of the core member 71 is restrained, and also when the food 300 is discharged, the core member 71 having a bar shape is blocked from moving outside of the inner portion 10. If the core member 71 has a weak fixation power, a separate electromagnet may be additionally installed.

A permanent magnet may be used as the fixing member 72, and an electromagnet may be used as necessary. The core member 71 is attached by a magnetic force. The fixing member 72 that is fixed to the inside of the outer portion 20 has the magnetic poles that are opposite to a polarity of the core member 71. Therefore, the core member 71 positioned at the inside of the inner portion 10 is fixed in a predetermined direction by a magnetism.

When the inner portion 10 is rotated, the food 300 existing at the inside of the inner portion 10 rotates, and since the core member 71 that is a magnetic bar is fixed, the core member 71 evenly mixes the food 300.

As the magnet used for the core member 71 and the fixing member 72, a neodymium magnet, a samarium-cobalt magnet, or an alnico magnet may be used. Additionally, a solenoid electromagnet may be used.

In the present disclosure, by using the first stirring portion 60 and the second stirring portion 70, the food 300 may be rapidly and easily mixed. The food 300 is stirred by a double action of the first stirring portion 60 and the second stirring portion 70. In addition, although one first stirring portion 60 and one second stirring portion 70 are installed in the inner portion 10 for example, but the present disclosure is not limited thereto, and a plurality of first stirring portions 60 may be installed in the inner portion 60. In addition, the second stirring portion 70 may also be deformed in various shapes, and a plurality of second stirring portions 70 may be installed in the inner portion 10.

The heating portion 80 may be variously modified within the technical idea of using electrical energy to heat the inner portion 10. The heating portion 80 according to an embodiment of the present disclosure may include an induction wire 81 that is installed in a shape that surrounds the outside of the outer portion 20. When the induction wire 81 is operated, the inner portion 10 is heated by eddy currents generated by a magnetic induction so that the food 300 is heated.

Figure 9:
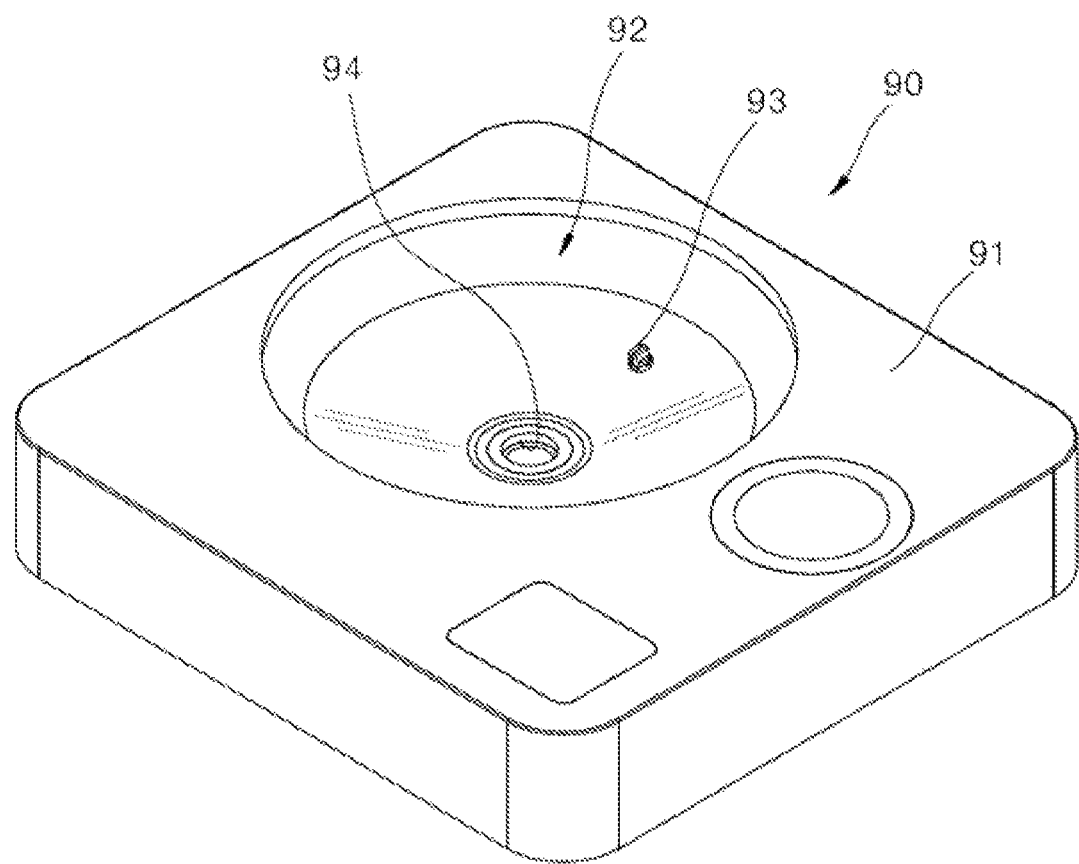
FIG. 9 is a perspective view illustrating a receiving portion according to an embodiment of the present disclosure.

FIG. 9 is a perspective view illustrating the receiving portion 90 according to an embodiment of the present disclosure.

As illustrated in FIG. 9, the receiving portion 90 may be variously modified within the technical idea in which the receiving portion 90 supports the second driving portion 40 and is positioned at the lower side of the housing portion 25. The receiving portion 90 according to an embodiment of the present disclosure may include: a body portion 91 configured to support the second driving portion 40; a water collecting portion 92 formed with a groove portion that has a shape concaved downwardly from an upper portion of the body portion 91 facing the housing portion 25; and an injecting portion 93 installed at the body portion 91 and configured to inject water toward the inner portion 10 or the housing portion 25.

The body portion 91 is positioned at a lower side of the housing portion 25, and is connected to the lower side of the second driving portion 40. The water collecting portion 92 is formed to be concaved toward a center portion thereof, and a water draining portion 94 is installed at the center portion of the water collecting portion 92.

Figure 5:
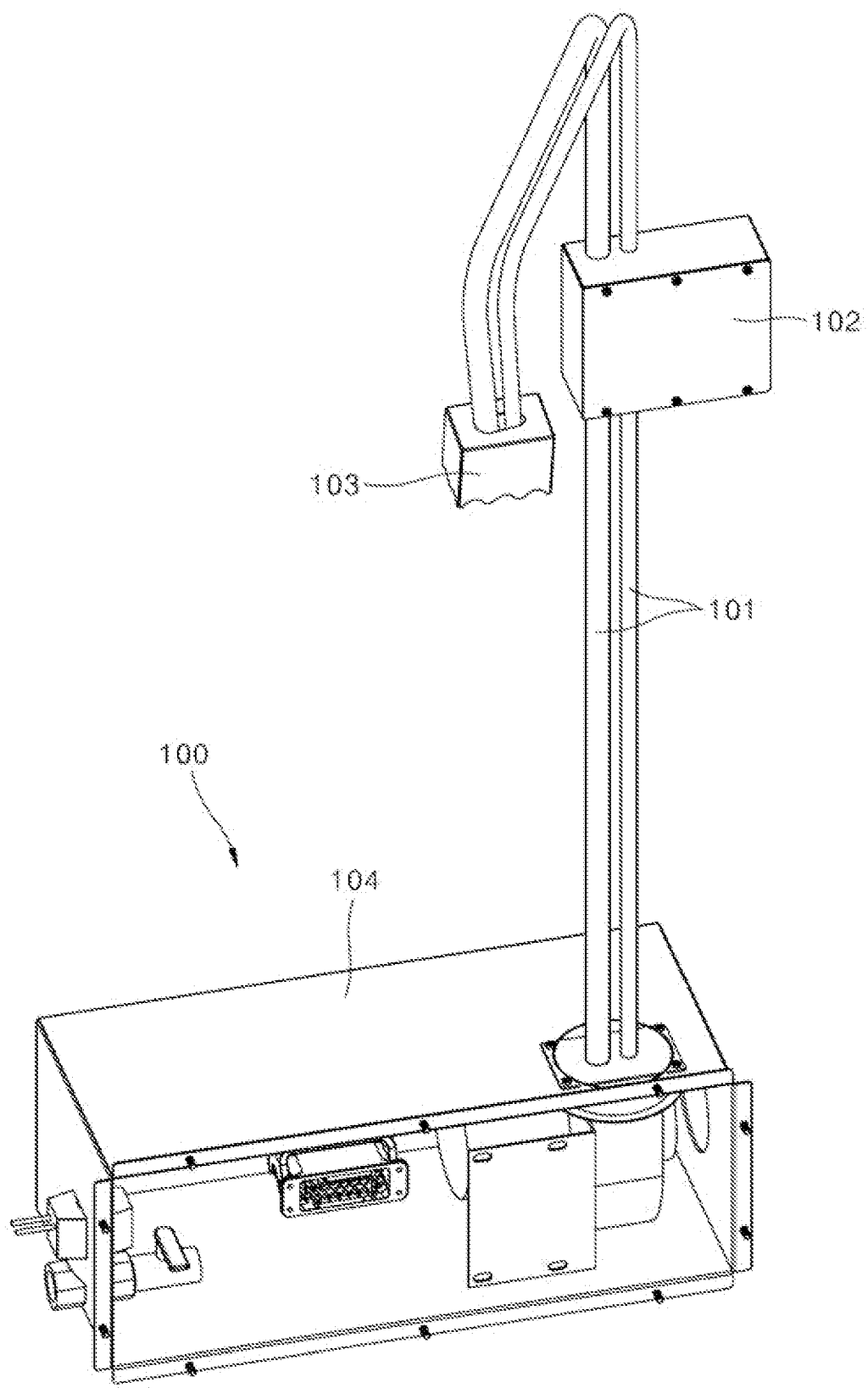
FIG. 5 is a perspective view illustrating a direct-firing portion according to an embodiment of the present disclosure.

FIG. 5 is a perspective view illustrating the direct-firing portion 100 according to an embodiment of the present disclosure.

As illustrated in FIG. 5, the direct-firing portion 100 may be variously modified within the technical idea in which the food 300 existing at the inside of the inner portion 10 is heated by a flame. The direct-firing portion 100 according to an embodiment of the present disclosure may include: a direct-firing pipeline 101 configured to supply both fuel gas and air toward the inner portion 10; and a valve portion 102 connected to the direct-firing pipeline 101 and configured to control a movement of the fuel gas and the air.

The direct-firing pipeline 101 may include: a gas moving pipe 105 configured to move gas that is becoming fuel; and an air moving pipe 106 configured to move air that is compressed by an air blower. The direct-firing pipeline 101 according to another embodiment of the present disclosure may be integrally formed that a pipe configured to move gas is included in a pipe configured to move air.

In addition, an electrical component related to the direct-firing portion 100 is positioned inside a direct-firing base portion 104, and the fuel gas and the air are moved along the direct-firing pipeline 101 that extends to an upper side of the direct-firing base portion 104. The movement of the fuel gas and the air is controlled by the valve portion 102 that is installed at the direct-firing pipeline 101, and flame is injected through the nozzle portion 103 that is installed at an end portion of the direct-firing pipeline 101.

Hereinafter, an operation state of the cooking apparatus 1 according to an embodiment of the present disclosure will be described in detail with reference to the accompanying drawings.

Figure 10:
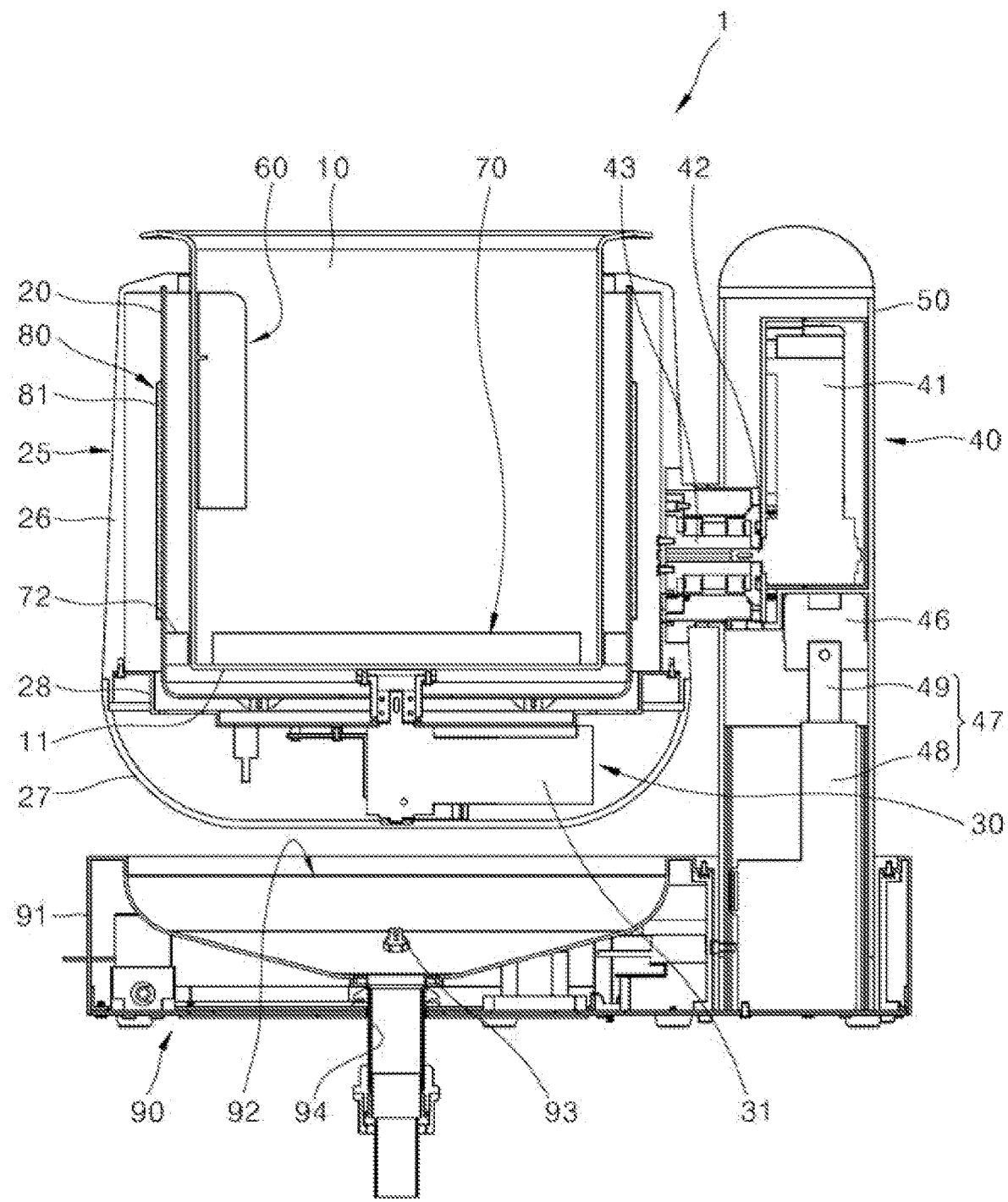
FIG. 10 is a cross-sectional view illustrating the cooking apparatus according to an embodiment of the present disclosure.

FIG. 10 is a cross-sectional view illustrating the cooking apparatus 1 according to an embodiment of the present disclosure. As illustrated in FIG. 1 and FIG. 10, when the food 300 is in a state of being contained in the inner portion 10, the first driving portion 30 is operated and the inner portion 10 is rotated. The first stirring portion 60 is rotated together with the inner portion 10, and the core member 71 of the second stirring portion 70 is in a state of being restrained from rotating so that the stirring of the food 300 is facilitated by the first stirring portion 60 and the second stirring portion 70.

In addition, when a direct-fired cooking is needed, the food 300 existing in the inner portion 10 is heated by flame generated through the nozzle portion 103.

After the food 300 has been cooked, the second motor member 41 is operated and rotates the housing portion 25 so that the food 300 is capable of being moved to another container by changing the inclination angle of the inner portion 10.

Figure 11:
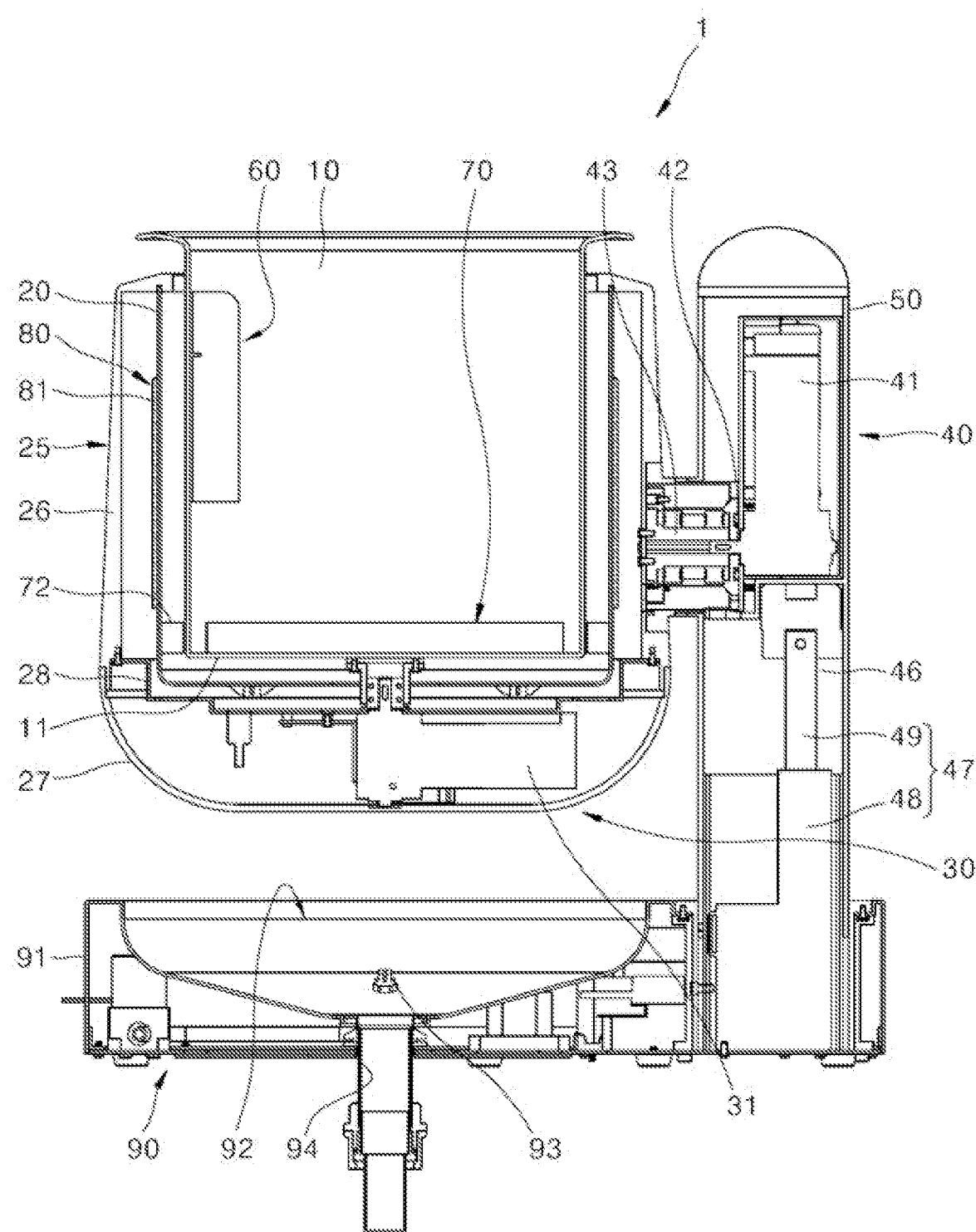
FIG. 11 is a cross-sectional view illustrating a state in which the inner portion is moved upward according to an embodiment of the present disclosure.

FIG. 11 is a cross-sectional view illustrating a state in which the inner portion 10 according to an embodiment of the present disclosure is moved upward.

As illustrated in FIGS. 10 and 11, when the entrance of the inner portion 10 is in a state of facing the upward, the inner support portion 46 moves upward together with the rod member 49 when the elevating portion 47 of the rod member 49 moves upward. Therefore, the power transmitting portion 43 and the housing portion 25 are also move upward.

Figure 12:
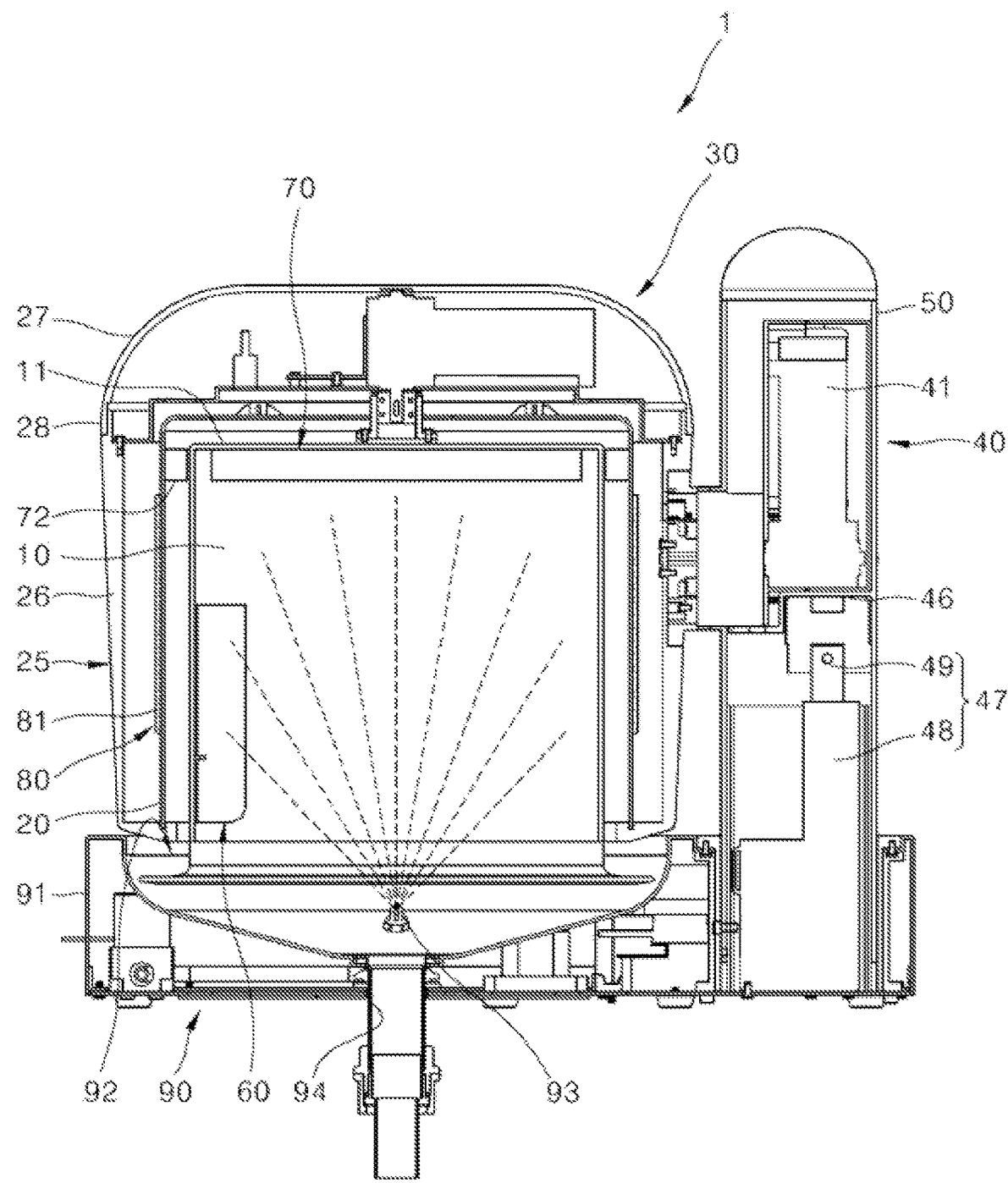
FIG. 12 is a cross-sectional view illustrating a state in which the inner portion is cleaned according to an embodiment of the present disclosure.

FIG. 12 is a cross-sectional view illustrating a state in which the inner portion 10 according to an embodiment of the present disclosure is cleaned.

As illustrated in FIG. 12, when the entrance of the inner portion 10 is in a state of facing downward by the second motor member 41 being operated, since the rod member 49 moves downward by the elevating portion 47 being operated, the inner portion 10 is also moved downward.

In addition, water injected from the injecting portion 93 cleans a remnant that has remained in the inner portion 10, and moves downward. A cleaning water moved along the water collecting portion 92 moves outside the body portion 91 through the water draining portion 94.

A temperature of the inner portion 10 is maintained high, and when pressure of water that is injected from the injecting portion 93, contents attached to the inner portion 10 or oil attached to the inner portion 10 may be easily removed.

Hereinafter, another embodiment that the inner portion 200 of the present disclosure is installed in an oval shape will be described with reference to the accompanying drawings.

Figure 13:
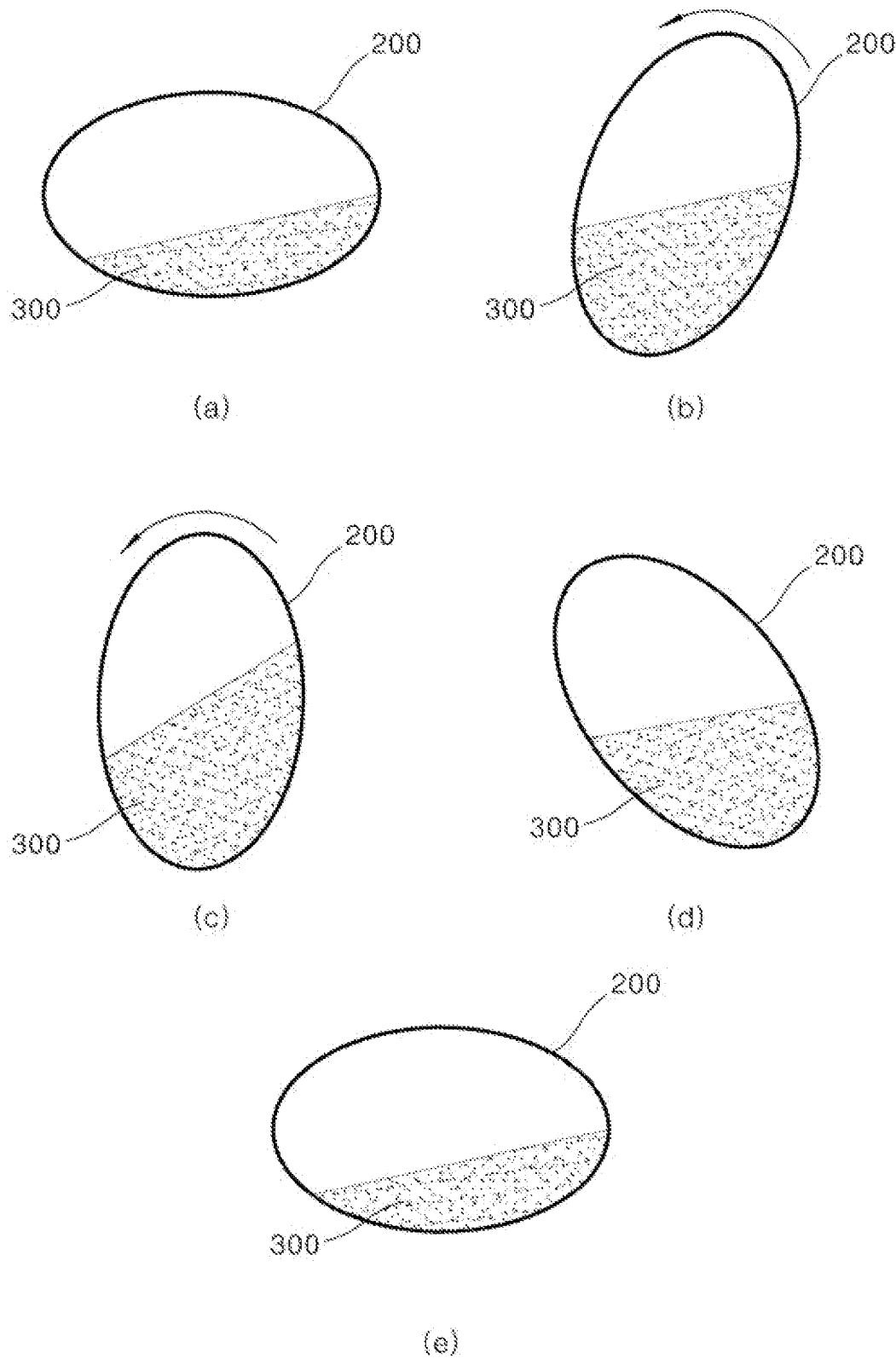
FIG. 13 shows plan views of rotating states of the inner portion formed in an oval shape according to another embodiment of the present disclosure.

FIG. 13 shows plan views of rotating states of the inner portion 200 formed in an oval shape according to another embodiment of the present disclosure. As illustrated in FIG. 13, the inner portion 200 according to another embodiment of the present disclosure has an oval cross-sectional shape.

When it is assumed that the inner portion 200 is rotated in a counter-clockwise direction, a height of contents positioned at a left side is relatively lower than a height of contents positioned at a right side so that the contents positioned at the right side flow down to the left side and are mixed. In other words, when rotating from a wide area of the floor to a narrow area of the floor, the contents positioned at a higher portion flow down to the left side and are in contact with an inner surface of the inner portion 200. Therefore, as the inner portion 200 is rotated, the food 300 is positioned at the bottom portion of the inner portion 200 so that the mixing of the food 300 may be more easily realized.

When the inner portion 200 has a circular cross-sectional shape, the food 300 positioned at a lower side continuously be in contact with the inner surface of the inner portion 200 so that the mixing does not occur well, and is only mixed by the first stirring portion 60 and the second stirring portion 70.

Therefore, when the inner portion 200 has the oval cross-sectional shape, the mixing of the food 300 may be more easily realized.

Figure 14:
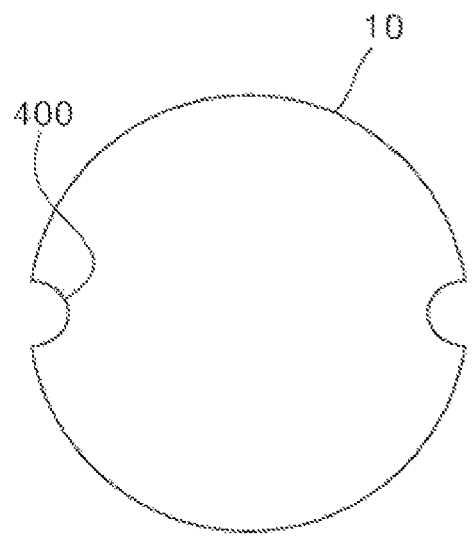
FIG. 14 shows plan views of states in which a plurality of protruding portions is installed at the inner portion according to another embodiment of the present disclosure.
Figure 14:
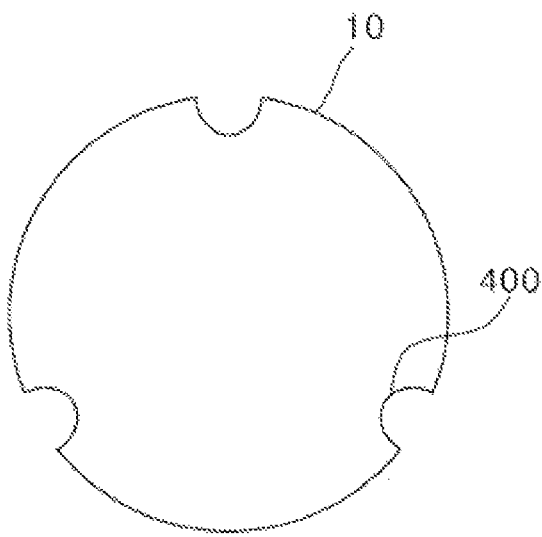
Figure 14:
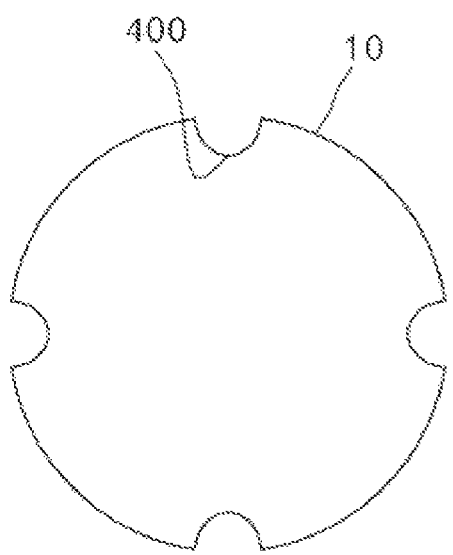
Figure 14:
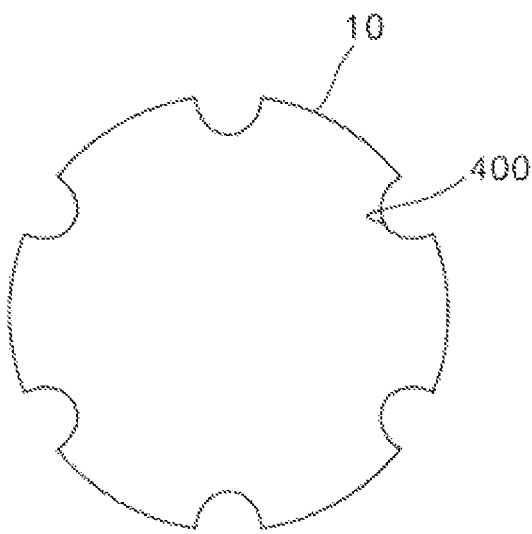

FIG. 14 shows plan views of states in which a plurality of protruding portions 400 is installed at the inner portion 10 according to another embodiment of the present disclosure.

As illustrated in FIG. 14, the plurality of protruding portions 400 that protrudes inside the inner portion 10 may be installed. Each of the plurality of protruding portions 400 may be variously modified within the technical idea that facilitates the mixing of the food 300 existing in the inner portion 10.

Since the plurality of protruding portions 400 rotated together with the inner portion 10 is provided, the food 300 may well be mixed without having a separate stirring wing, or having the first stirring portion 60 and the second stirring portion.

The plurality of the protrusions 400 may be integrally formed with the inner portion 10. When the inner portion 10 is manufactured, the plurality of protruding portions 400 that protrudes inside the inner portion 10 is formed together. In addition, the plurality of protruding portions 400 may be formed to facilitate the mixing of the food 300.

In order to prevent excessive shaking of the inner portion 10 when the plurality of protruding portions 400 is rotated together with the inner portion 10, an installation place and a shape of the plurality of protruding portions 400 are installed in consideration of a center of gravity and a rotation center of the inner portion 10. The plurality of protruding portions 400 according to the present disclosure may be installed along a circumference of the inner portion 10. In addition, the plurality of protruding portions 400 may be spaced apart to each other at a predetermined angle. For example, when only two protruding portions 400 are installed, each protruding portions 400 may be installed at 180 degrees intervals. In addition, when three protruding portions 400 are installed, each protruding portions may be installed at 120 degrees intervals. As such, when the installation number of the plurality of protruding portions 400 is represented to A, 360 degrees divide the A is a set angle.

In addition, a separately manufactured protruding portions 400 may be coupled to the inner portion 10.

Since there is no gap between the plurality of protruding portions 400 and the inner portion 10, a time and a cost that are required to clean the inner portion 10 may be reduced.

As described above, since the rotation and the inclination angle of the inner portion 10 and 200 are capable of being adjusted by using the first driving portion 30 and the second driving portion 40, a time and a cost for preparing the food 300 may be reduced since the food 300 is automatically heated by the heating portion 80 and the direct-firing portion 100. In addition, the food 300 is easily mixed by the first stirring portion 60 and the second stirring portion 70, and the inclination angle of the inner portion 10 and 200 is capable of being adjusted by using the second driving portion 40 so that various tastes of the food 300 may be prepared since the food 300 is mixed and stir-fried in various manners. In addition, since the cleaning of the inner portion 10 and 200 is automatically performed by the injecting portion 93, time and cost required to clean the inner portion 10 and 200 may be reduced.

As described above, the present disclosure is described with reference to the drawings. However, the present disclosure is not limited by the embodiments and drawings disclosed in the present specification. It will be apparent that various modifications may be made thereto by those skilled in the art within the scope of the present disclosure. Furthermore, although the effect resulting from the features of the present disclosure has not been explicitly described in the description of the embodiments of the present disclosure, it is obvious that a predictable effect resulting from the features of the present disclosure should be recognized.

The invention claimed is:
1. A cooking apparatus comprising:
an inner portion in which a food is contained and heated;

an outer portion installed in a shape that surrounds an outside of the inner portion;

a heating portion configured to heat the inner portion by using electrical energy;

a housing portion installed in a shape that surrounds both the heating portion and the outer portion;

a first driving portion positioned between the outer portion and the housing portion, and configured to rotate the inner portion in a first direction; and a second driving portion positioned outside the housing portion and configured to rotate the housing portion in a second direction, wherein the second driving portion comprises:

a second motor member installed in a position spaced apart from the housing portion, and configured to convert electrical energy to rotational power;

a power transmitting portion connecting a second output shaft to the housing portion;

an inner support portion configured to support the second motor member; and an elevating portion configured to ascend and descend the inner support portion, and wherein the housing portion that receives the rotational power of the second motor member is rotated in the second direction.

2. The cooking apparatus of claim 1, wherein the first direction is a direction in which the inner portion is rotated around a first imaginary line that extends in a longitudinal direction of the inner portion, and the second direction is a direction in which the housing portion is rotated around a second imaginary line that extends to a side surface of the housing portion.

3. The cooking apparatus of claim 1, further comprising a first stirring portion fixed to an inside of the inner portion and configured to stir the food by being rotated together with the inner portion.

4. The cooking apparatus of claim 3, wherein the first stirring portion protrudes to the inside of the inner portion and extends in a longitudinal direction of the inner portion.

5. The cooking apparatus of claim 3, further comprising a second stirring portion installed in a direction intersecting the first stirring portion, the second stirring portion being positioned at a base member of the inner portion, and being configured to stir the food together with the first stirring portion.

6. The cooking apparatus of claim 5, wherein the second stirring portion comprises:

a core member positioned at an upper portion of the base member, and provided with magnetic poles at both sides thereof; and a fixed member fixed to an inside of the housing portion facing the core member, and provided with magnetic poles that are opposite to the magnetic poles of the core member, wherein when the inner portion is rotated, a rotation of the core member is restrained by the fixed member.

7. The cooking apparatus of claim 1, wherein the heating portion comprises an induction wire installed in a shape that surrounds an outside of the outer portion.

8. The cooking apparatus of claim 1, wherein the first driving portion comprises a first motor member fixed to the housing portion facing the outer portion and configured to convert electrical energy to rotational power, and wherein a first output shaft of the first motor member is connected to a rotation center of the inner portion and is configured to rotate the inner portion in the first direction.

9. The cooking apparatus of claim 1, wherein the second driving portion further comprises:

a target measurement member fixed to the power transmitting portion, and configured to be rotated together with the power transmitting portion; and a sensor member installed at a position facing a movement path of the target measurement member, and configured to detect a movement of the target measurement member in a non-contact manner.

10. The cooking apparatus of claim 1, wherein the elevating portion comprises:

an elevating body positioned at a lower side of the inner support portion and configured to generate power; and a rod member that protrudes to an upper side of the elevating body and is connected to the inner support portion, and configured to be moved in a vertical direction by a movement of the elevating body.

11. The cooking apparatus of claim 1, further comprising:

a direct-firing pipeline configured to supply both fuel gas and air toward the inner portion; and a valve portion connected to the direct-firing pipeline and configured to control both the fuel gas and the air.

12. The cooking apparatus of claim 1, further comprising a plurality of protruding portions provided along a circumference of the inner portion, the protruding portions protruding to an inside of the inner portion, and being integrally formed with the inner portion.

13. The cooking apparatus of claim 1, wherein the inner portion has an oval cross-sectional shape.

14. The cooking apparatus of claim 1, further comprising:

a body portion configured to support the second driving portion;

a water collecting portion formed with a groove portion that has a shape concaved downwardly from an upper portion of the body portion facing the housing portion; and an injecting portion installed at the body portion and configured to inject water toward the inner portion or the housing portion.

15. The cooking apparatus of claim 14, further comprising:

a direct-firing pipeline configured to supply both fuel gas and air toward the inner portion; and a valve portion connected to the direct-firing pipeline and configured to control both the fuel gas and the air.

16. The cooking apparatus of claim 14, further comprising a plurality of protruding portions provided along a circumference of the inner portion, the protruding portions protruding to an inside of the inner portion, and being integrally formed with the inner portion.

17. The cooking apparatus of claim 14, wherein the inner portion has an oval cross-sectional shape.

* * * * *